United States Patent
Goeusse et al.

(10) Patent No.: US 7,941,711 B2
(45) Date of Patent: May 10, 2011

(54) DETERMINING BIT ERROR RATE USING SINGLE DATA BURST

(75) Inventors: Francois R. D. Goeusse, Grasse (FR); Francois Mazard, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 100 days.

(21) Appl. No.: 12/328,409

(22) Filed: Dec. 4, 2008

(65) Prior Publication Data

US 2009/0144591 A1   Jun. 4, 2009

(30) Foreign Application Priority Data

Dec. 4, 2007 (EP) ..................................... 07291451

(51) Int. Cl.
*G06F 11/00* (2006.01)
(52) U.S. Cl. ....................................... 714/708; 714/704
(58) Field of Classification Search .................. 714/704, 714/708

See application file for complete search history.

(56) References Cited

U.S. PATENT DOCUMENTS

| | | | | |
|---|---|---|---|---|
| 6,785,859 B2* | 8/2004 | Goldman | | 714/755 |
| 6,868,519 B2* | 3/2005 | Beacken et al. | | 714/762 |
| 7,219,113 B2* | 5/2007 | Bonaccio et al. | | 708/250 |
| 7,281,188 B1* | 10/2007 | Bonwick et al. | | 714/752 |
| 7,404,115 B2* | 7/2008 | Boudon et al. | | 714/715 |
| 7,412,640 B2* | 8/2008 | Kapur et al. | | 714/742 |
| 7,730,367 B2* | 6/2010 | Parthasarathy | | 714/716 |
| 2006/0143549 A1* | 6/2006 | Yasumoto et al. | | 714/704 |

* cited by examiner

*Primary Examiner* — James C Kerveros
(74) *Attorney, Agent, or Firm* — Ronald O. Neerings; Wade James Brady, III; Frederick J. Telecky, Jr.

(57) ABSTRACT

A communication system includes a transceiver capable of receiving a data burst as part of a paging block and a processing logic capable of comparing at least part of the data burst to a plurality of permutations of the data burst to locate a matching permutation. The processing logic determines a bit error rate (BER) in accordance with a difference between the data burst and the matching permutation. The processing logic uses the BER to operate the communication system.

20 Claims, 3 Drawing Sheets

DETERMINING BIT ERROR RATE USING SINGLE DATA BURST

RELATED APPLICATIONS

This application claims priority to and incorporates by reference EP Patent Application No. 07291451.8, filed Dec. 4, 2007, entitled "Pattern Based BER Measurement," and is incorporated herein by reference in its entirety.

BACKGROUND

Mobile communication devices (MCDs) communicate wirelessly with other devices, such as base towers. Data is often transmitted to an MCD using paging blocks, which are known in the art. A paging block may be sent in increments known as "bursts." Many applications require that the MCD decode these bursts as they arrive, instead of waiting for the entire paging block to be received. Such decoding benefits from an accurate determination of the bit error rate (BER), but, unfortunately, accurately determining the BER in such applications is difficult.

SUMMARY

The problems noted above are solved in large part by a technique for determining the bit error rate (BER) using a single burst of data. In an illustrative embodiment, a communication system comprises a transceiver capable of receiving a data burst as part of a paging block. The system also comprises processing logic capable of comparing at least part of the data burst to a plurality of permutations of the data burst to locate a matching permutation. The processing logic determines a bit error rate (BER) in accordance with a difference between the data burst and the matching permutation. The processing logic uses the BER to operate the communication system.

Another illustrative embodiment includes a method that comprises a wireless device receiving a burst of data, where the burst is part of a paging block. The method also comprises comparing at least part of the burst to a list of permutations of the burst to locate a match. The method further comprises determining a bit error rate (BER) using a difference between the match and the burst and using the BER to perform operations associated with the wireless device.

Yet another illustrative embodiment includes a computer-readable medium comprising software which, when executed, causes a processor to receive a paging block data burst, determine differences between contents of the data burst and each of a plurality of permutations corresponding to the contents, determine which of the differences is least relative to the remaining differences, use the least difference to determine a bit error rate (BER), and use the BER to perform wireless operations associated with the processor.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The terms "cellular telephone," "cell phone," "mobile," "mobile phone," "handy," "mobile communication device," etc., regardless of whether they are all used in herein, are generally synonymous. As described herein, bit error rate ("BER") is a custom bit error rate, which may denote in some cases a "soft decision" value that reflects the difference between a theoretical value and an actual value.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Disclosed herein is a technique that enables a mobile communication device (MCD) to determine a bit error rate (BER) after decoding just one burst of data that belongs to a paging block. This technique may be implemented in a variety of applications, including single burst decode systems, Global System for Mobile Communications (GSM) General Packet Radio Service (GPRS) systems, etc. Paging block bursts contain various types of information. The contents of at least some of these bursts belong to a finite list of permutations. Thus, these contents can be compared to a corresponding, finite list of permutations to find a matching permutation. The matching permutation is indicative of what the data burst contents should be, but are not, due to noise introduced during wireless transmission. Thus, the difference between the contents and the matching permutation is representative of the BER, which the MCD may use as desired.

Figure 1A:
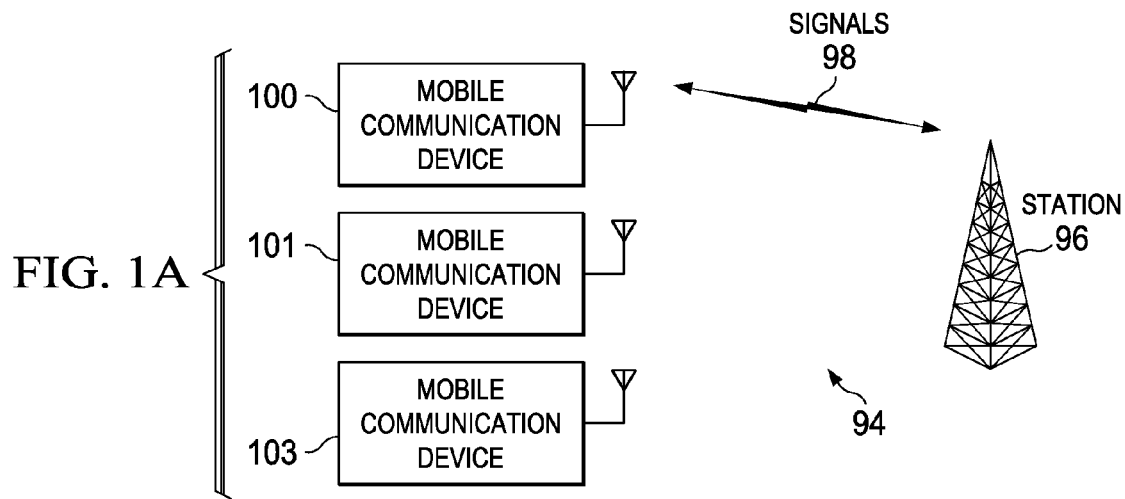
FIG. 1a shows an illustrative network in accordance with embodiments.

FIG. 1a shows an illustrative communications network 94 comprising a control station (e.g., a cell base station) 96 and multiple MCDs 100, 101, 103. The MCD may be of different types (e.g., cell phones, personal digital assistants, digital media players). In some embodiments, the network 94 comprises those MCD with which the control station 96 is able to wirelessly communicate. In at least some embodiments, the network 94 comprises a mobile phone network cell. The network 94 may implement one or more of a variety of communication technologies and/or standards, including the Global System for Mobile Communications (GSM) standard, first generation analog technology, second generation (2G) digital/personal communication service (PCS) technology or third generation (3G) technology. As mentioned above, GPRS also may be used, in addition to Enhanced Data rates for GSM Evolution (EDGE) platforms. The techniques described herein also may be modified as necessary to suit other standards, e.g., fourth generation (4G) technology, in which internet-protocol (IP) based communications are implemented. All such communication protocols, standards and variations thereof are encompassed within the scope of this disclosure. As represented by numeral 98, the station 96 trades various signals with the MCD 100. Such signals may carry audio and video data as well as information needed by the MCD 100 to establish and/or maintain proper communication with the station 96.

The signals 98 include a Paging Channel (PCH). The station 96 broadcasts paging signals on the PCH when communications need to be established with one of the MCDs. For example, a MCD (or a land-line phone) in a different network (not shown) may initiate a phone call to the MCD 100. The station 96 receives a signal indicating that the MCD in the other network is attempting to establish a phone call with the MCD 100. Accordingly, the station 96 broadcasts on the PCH a paging signal which specifically pages the MCD 100, requesting the MCD 100 to respond by establishing a phone call session with the station 96.

Each of the MCDs in the network 94 regularly monitors the PCH for paging signals (e.g., once every second). Thus, when the station 96 broadcasts the aforementioned paging signal, each of the MCDs in the network 94 will receive the paging signal, even though the paging signal is intended only for the MCD 100. Upon receiving the paging signal, each MCD will determine—using any suitable, established protocol—whether the paging signal was intended for that MCD. In this way, the MCD 100 will determine that the paging signal was intended for the MCD 100, and the remaining MCDs in the network 94 will determine that the paging signal was not intended for those MCDs. Accordingly, the MCD 100 establishes a phone call session with the station 96, and the station 96 (via other network logic) establishes communications between the MCD 100 and the phone in the other network attempting to call the MCD 100.

Figure 1B:
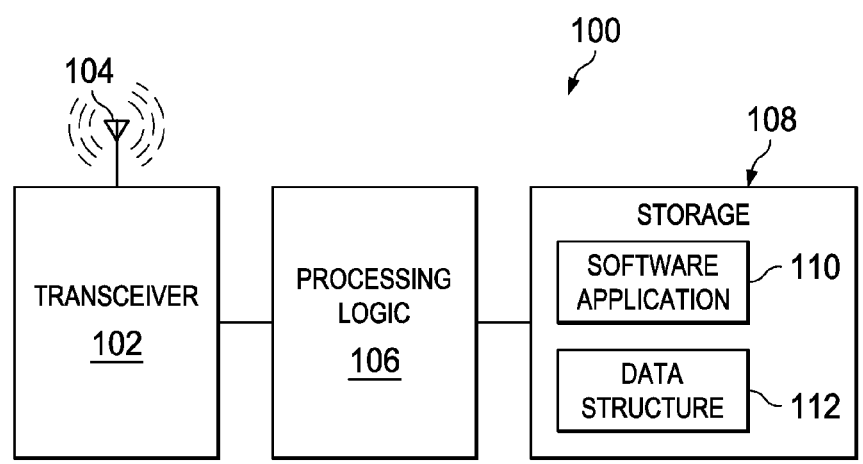
FIG. 1b shows a block diagram of an illustrative mobile communication device, in accordance with embodiments.

FIG. 1b shows a block diagram of an illustrative MCD 100 implementing the technique disclosed herein. The MCD 100 comprises a transceiver 102 and an antenna 104 by which the MCD wirelessly communicates with other devices. The transceiver 102 couples to processing logic 106, which controls the general actions of the MCD 100. The processing logic 106 couples to storage 108 which, in turn, comprises software application 110. The storage 108 comprises a computer-readable medium and the software application 110 comprises code which, when executed by the processing logic 106, causes the processing logic 106 to implement the technique described herein. Storage 108 also comprises data structure 112, the contents and purpose of which are described below. At least some of the components shown in FIG. 1b may be included as part of a digital signal processing (DSP) chip.

Figure 2:
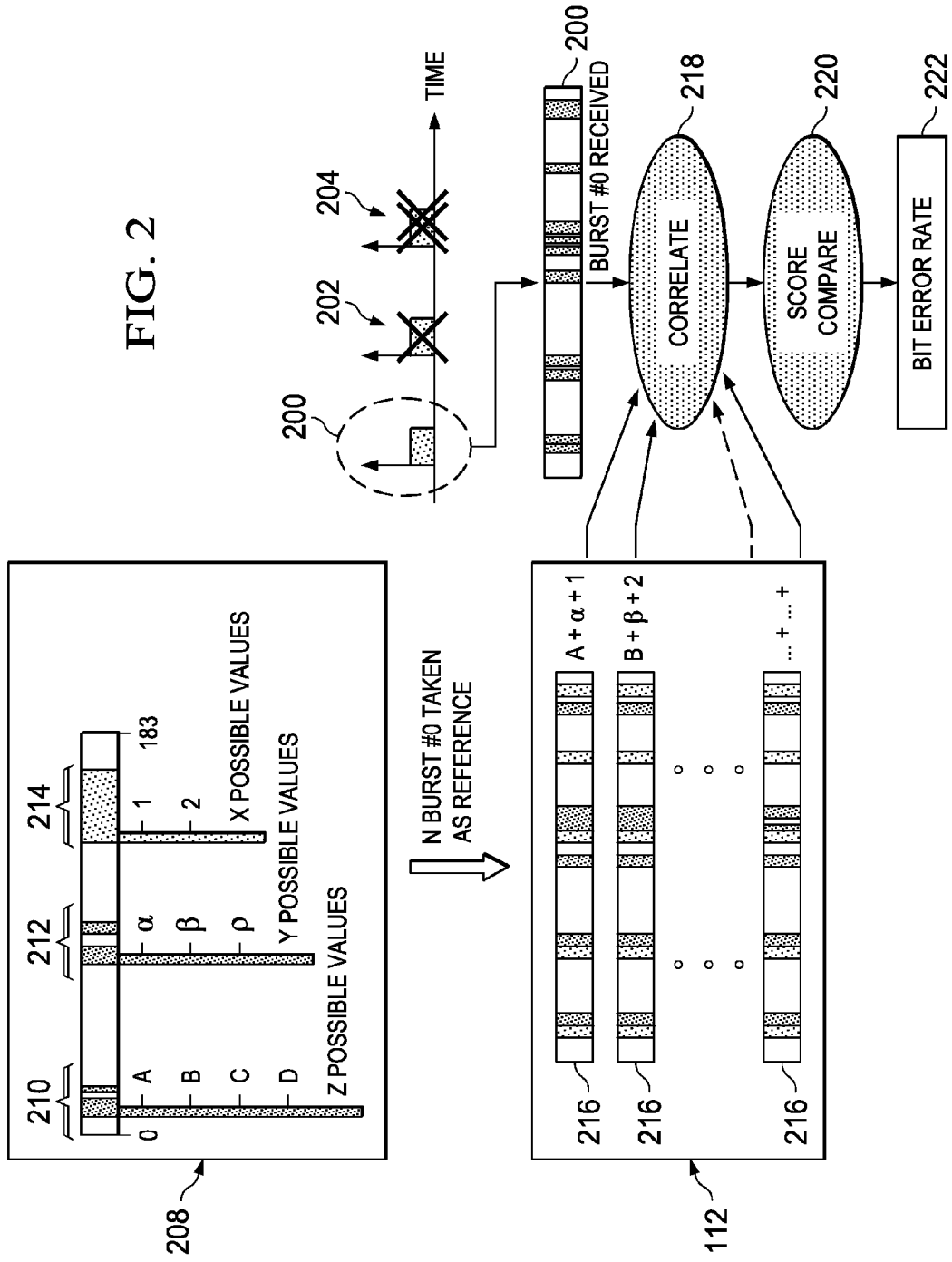
FIG. 2 shows a conceptual illustration of the technique disclosed herein, in accordance with embodiments.

FIG. 2 shows a conceptual illustration of the technique described herein. Numerals 200, 202 and 204 represent bursts of data received by the MCD 100 as part of a paging block. Burst 200 is the first burst received as part of that paging block. As shown, burst 200 is encoded with various data, represented by vertical markers in the graphical representation of the burst 200. Numeral 208 shows how each burst contains traces of multiple fields 210, 212 and 214. Additional fields also may be included. Each field may have a finite number of possible entries. For example, as shown, field 210 has "Z" possible values, where Z is a positive number. Thus, some of the possible values may include A, B, C, D, etc. Similarly, field 212 has "Y" possible values, where "Y" is a positive number. Thus, some of the possible values may include α, β, ρ, etc. Likewise, field 214 has "X" possible values, where "X" is a positive number. Thus, some of the possible values may include 1, 2, 3, etc. Any and all such variations and permutations are encompassed within the scope of this disclosure.

Data structure 112 contains some or all of the possible permutations of the burst 200. These permutations are represented as permutations 216. For example, referring to numeral 208, if Z is 10, Y is 5 and X is 2, data structure 112 may comprise up to 100 total permutations (10 multiplied by 5 and by 2). When executed by the processing logic 106, the software application 110 causes the processing logic 106 to compare at least some of the data patterns in the burst packet 200 with each of the permutations 216 stored in the data structure 112, as indicated by numeral 218. The comparison produces a score for each of the permutations in the data structure 112. The score is indicative of the similarity between the contents of the burst packet 200 and the corresponding permutation 216. The higher the score, the better the match. In at least some embodiments, scoring is performed by comparing the packet and permutation bit by bit, by increasing (e.g., incrementing) the score if a match is found, and by decreasing (decrementing) the score if no match is found. In some embodiments, instead of a bit-by-bit comparison, a "soft decision" approach may be taken in which theoretical values are compared to actual values to determine differences. As indicated by numeral 220, the processing logic 106 then compares each of the scores to a pre-programmed threshold. The threshold may be programmed into the storage 108 by a programmer, a user of the MCD, etc. Each score that meets or exceeds the threshold is considered to be a "match" with the burst packet 200. Each score that fails to meet or exceed the threshold is not considered to be a match with the burst packet 200.

The software application 110 then causes the processing logic 106 to determine which of the matching permutations 216 most closely matches the contents of the burst packet 200. In at least some embodiments, the processing logic 106 accomplishes this by determining which of the permutations 216 has the highest score. The permutation 216 that most closely matches the burst packet 200 is representative of what the contents of the burst packet 200 should be. Because this permutation 216 is representative of what the contents of the burst packet 200 should be, the difference between this permutation 216 and the actual contents of the burst packet 200 is indicative of the error acquired while the burst packet 200 was wirelessly transmitted to the MCD 100. Thus, this error may be used to determine the BER. For example, in some embodiments, the BER is calculated using the difference between the closest match and the actual burst packet. Any of a variety of other suitable techniques for calculating BER also may be used. In this way, the BER is determined using the first burst 200 and prior to decoding or demodulating the entire paging block.

Once the BER is determined, the processing logic 106 may use it as desired. For example, the BER may be used to gauge the general signal quality that the MCD 100 is receiving and the signal quality may be shown to the user via a display (e.g., in the form of "signal bars"). The BER also may be used for a variety of other purposes. For example, in single-burst decode applications, the BER may be used to determine when the processing logic 106 may stop demodulating burst packets received as part of a paging block. Other uses are included within the scope of this disclosure.

Figure 3:
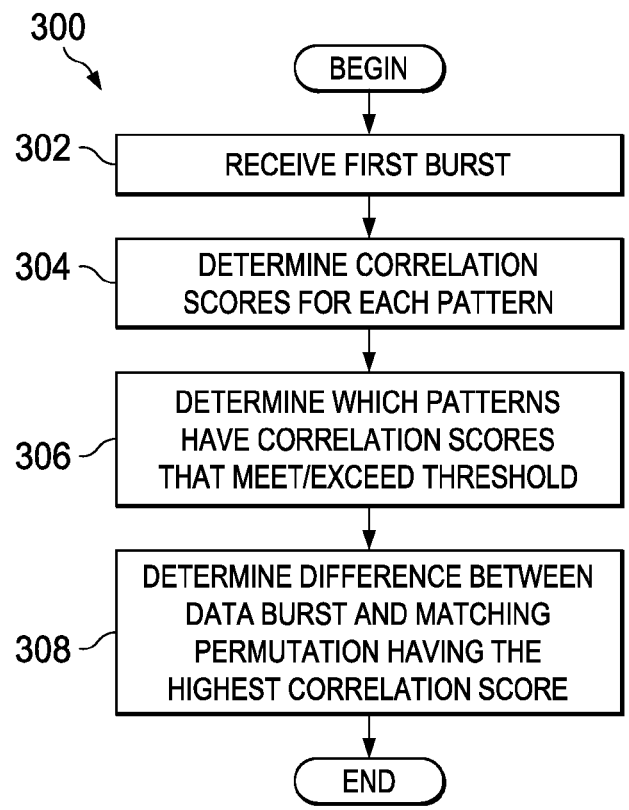
FIG. 3 shows a flow diagram of an illustrative method that implements the technique disclosed herein, in accordance with embodiments.

FIG. 3 shows a flow diagram of an illustrative method 300 implemented in accordance with various embodiments. The method 300 comprises receiving a first burst that is part of a paging block (block 302). The method 300 then comprises determining correlation scores for each pattern, or permutation, that corresponds to the first burst and that is stored in a data structure (block 304). The method further comprises determining which patterns or permutations have correlation scores that meet or exceed a threshold (block 306). The permutation(s) that meet or exceed the threshold are categorized as matches to the data burst. The method 300 still further comprises determining which of the matches corresponds to a correlation score that is higher than the other correlation scores. The difference between the data burst and the permutation corresponding to the highest correlation score is the BER (block 308).

Figure 4:
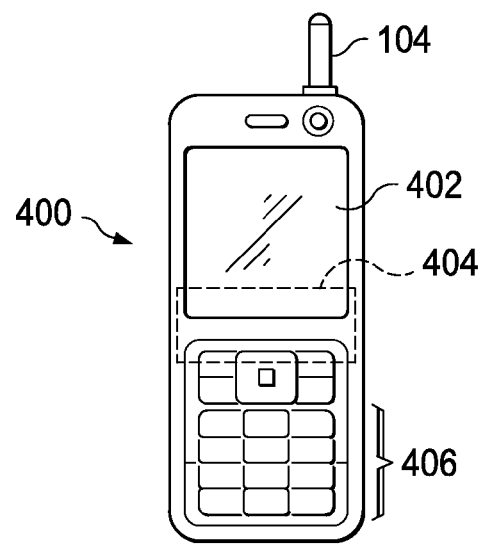
FIG. 4 shows an illustrative mobile communication device implementing the technique disclosed herein, in accordance with embodiments.

FIG. 4 shows an illustrative mobile communication device 400 that houses the circuit logic shown in FIG. 1b. The mobile communication device 400 may include any suitable wireless device, including a cell phone, a PDA, a digital entertainment device, etc. The device 400 comprises a display 402, an electronics package 404, a keypad 406 and an antenna 104. The electronics package 404 houses the circuit logic shown in FIG. 1b and controls the display 402, keypad 406 and antenna 104.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A communication system, comprising:
 a transceiver capable of receiving a data burst as part of a paging block; and
 processing logic capable of comparing at least part of said data burst to a plurality of permutations of the data burst to locate a matching permutation;
 wherein the processing logic determines a bit error rate (BER) in accordance with a difference between the data burst and the matching permutation;
 wherein the processing logic uses the BER to operate the communication system.

2. The system of claim 1, wherein the system comprises a mobile communication device.

3. The system of claim 1, wherein the BER is determined using said difference.

4. The system of claim 1, wherein said plurality of permutations includes all permutations of the data burst.

5. The system of claim 1, wherein said difference is representative of error added to said data burst.

6. The system of claim 1, wherein the processing logic determines the BER prior to the entire paging block being decoded.

7. The system of claim 1, wherein the data burst is the first data burst received as part of the paging block.

8. A method, comprising:
 a wireless device receiving a burst of data, said burst part of a paging block;
 comparing at least part of said burst to a list of permutations of said burst to locate a match;
 determining a bit error rate (BER) using a difference between said match and the burst; and
 using the BER to perform operations associated with the wireless device.

9. The method of claim 8, wherein comparing the burst to said list of permutations comprises using a finite list that contains all possible permutations of said burst.

10. The method of claim 8, wherein said difference is indicative of error added to the burst during transmission.

11. The method of claim 8, further comprising determining a score for each of said permutations in said list, the score of each permutation indicative of a similarity between that permutation and said burst.

12. The method of claim 11, wherein said step of determine BER comprises determining the permutation with the highest score.

13. The method of claim 8, wherein determining the BER comprises determining the BER prior to decoding the entire paging block.

14. The method of claim 8, wherein said burst is the first among data bursts received as part of the paging block.

15. A computer-readable medium for storing software instruction which, when executed by an apparatus, causes a processor to:
 receive a paging block data burst;
 determine differences between contents of the data burst and each of a plurality of permutations corresponding to said contents;
 determine which of said differences is least relative to the remaining differences;
 use said least difference to determine a bit error rate (BER); and
 use the BER to perform wireless operations associated with said processor.

16. The computer-readable medium of claim 15, wherein the plurality of permutations comprises all permutations that corresponds to said contents.

17. The computer-readable medium of claim 15, wherein the computer-readable medium comprises storage housed within a digital signal processor (DSP).

18. The computer-readable medium of claim 15, wherein said least difference is indicative of error added to the data burst during wireless transmission.

19. The computer-readable medium of claim 15, wherein the BER comprises said least difference.

20. The computer-readable medium of claim 15, wherein the processor determines the BER prior to decoding the entire paging block.

* * * * *